Figure 1:
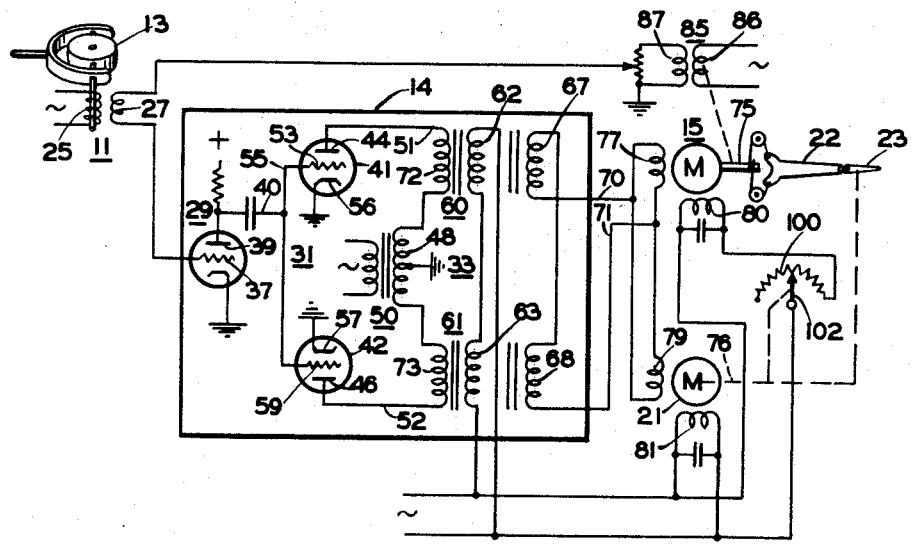

Aug. 16, 1960  C. R. BELL  2,949,259

AUTOMATIC STEERING SYSTEM FOR AIRCRAFT

Filed Aug. 25, 1953

INVENTOR

CHARLES R. BELL

BY Oscar B Brumback

ATTORNEY

United States Patent Office 2,949,259
Patented Aug. 16, 1960

2,949,259

AUTOMATIC STEERING SYSTEM FOR AIRCRAFT

Charles R. Bell, Bergenfield, N.J., assignor to Bendix Aviation Corporation, Teterboro, N.J., a corporation of Delaware Filed Aug. 25, 1953, Ser. No. 376,466

6 Claims. (Cl. 244—77)

This invention relates generally to automatic control systems for aircraft and more particularly to a system for regulating the control action of the motor in the control system which positions a control surface in response to change in attitude of the craft.

For an aircraft to maintain steady flight, three fundamental equations of mechanics must be satisfied: the summation of vertical forces must be zero, the summation of horizontal forces must be zero, and the summation of the moment of these forces about the center of gravity must be zero. In other words, the lift developed by the wings at this time is equal to the weight of the craft; the thrust developed by the motors is equal to the drag or air resistance; and the summation of the moments of these forces is zero, a moment of force being the product of a force and its distance of application from the center of gravity. An aircraft is designed so that all the forces about the center of gravity may be adjusted to zero or be balanced under flying conditions.

In an aircraft which is stable longitudinally, the resultant moment of all the forces about the center of gravity should be negative or diving as the angle of attack is increased, and positive or climbing as the angle of attack is decreased. This will tend to restore the original angle of attack.

The position of the center of gravity, therefore, greatly influences the longitudinal stability of the craft.

Assuming, for example, that the lift developed by the wings is a force located at the center of pressure of the wing, it will be readily apparent that when the center of gravity is positioned well ahead of the center of pressure, the craft is stable because an increase in the angle of attack increases the diving moment and a decrease in the angle of attack decreases the diving moment. As the center of gravity is moved further back, however, the craft becomes more and more unstable.

Another influence on the longitudinal stability characteristics of the aircraft is the elevator and horizontal stabilizer section. In its normal position, the moment about the center of gravity developed by the elevator surface tends toward stability. It has an action somewhat like a weathervane. If disturbed, the pressure of the wind on the elevator surface since it is acting behind the center of movement or center of gravity, sets up a moment about the center of gravity which tends to rotate the craft about its center of gravity in a direction to restore the surface to its normal position in the wind. Increasing the distance between the center of pressure of the elevator surface and the center of gravity will increase the moment of the force since its distance of application is greater, making the restoring moment larger per degree of swing from the normal position and thereby increasing the stability.

Shifts in the center of gravity of an aircraft normally occur in flight because of changes in the position of loads in the aircraft. Such changes, for example, may be due to the movement of passengers and the depletion of the engine fuel supply. Due to the length of modern aircraft, these changes in the position of loading may cause large changes in moments and shifts in the center of gravity. A compensation must be made for these changes to enable the craft to maintain a desired attitude.

Compensation for tail or nose heavy conditions of an aircraft are conventionally made by deflection of the elevator surfaces and trim tab surfaces. Deflecting an elevator surface, however, changes its angle of attack. This increases the loading on the elevator surface and requires the application of a torque to maintain it in the new position. The trim tab surfaces supply this torque, or hinge moment. As a result, the average force required of the human pilot or automatic control system can be reduced to zero in spite of a new trim condition existing about the pitch axis.

Although an aircraft with its center of gravity at its normal position in flight requires little or no elevator trim tab action, excursions of the center of gravity forward or aft require corresponding changes in the position of the trim tab surface. Thus, the position of the trim tab surface may be considered to be a function of the position of the center of gravity. Since the action of the elevator surface exerts a great influence on the longitudinal stability of the craft, it is desirable that the maximum allowable torque applied to the elevator surface be reduced from normal under adverse center of gravity conditions although at other times, a torque exceeding the normal value may be desirable or required to fly the craft satisfactorily.

More specifically, it is desirable to increase the maximum allowable torque when the center of gravity moves rearwardly of the craft and to decrease the maximum allowable torque when the center of gravity moves forwardly of the craft.

An object of the present invention, therefore, is to provide a novel apparatus for stabilizing the attitude of a craft about its axis.

Another object is to provide a novel apparatus for controlling the torque available for application to the elevator surface under different conditions of loading.

A further object is to provide novel apparatus for varying the available torque of a servomotor as a function of the position of the center of gravity of an aircraft.

The present invention contemplates providing an aircraft having a main control surface and a trim tab surface with a novel apparatus whereby the trim tab surface position, which is indicative of the loading conditions existent about an axis of the aircraft, controls by way of an interlock between the trim tab surface operating mechanism and the main control surface servomotor, the maximum servo effort that is available for the main surface.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

Figure 2:
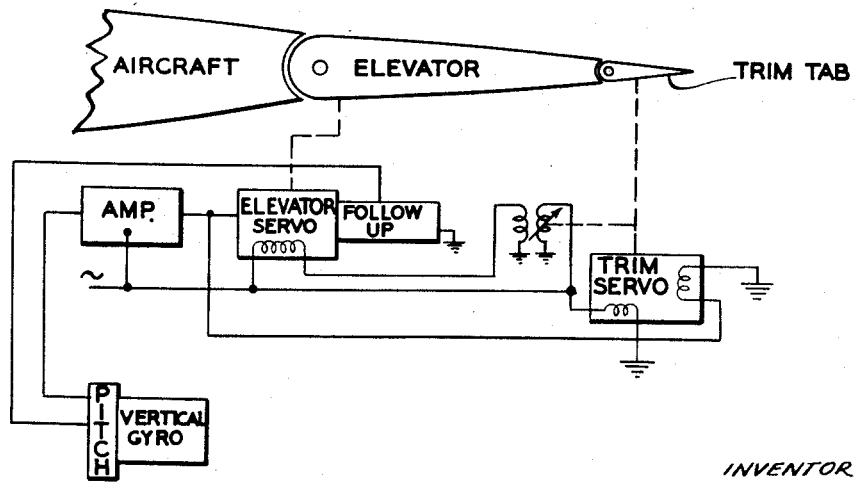

In the single sheet of drawing:

Figure 1 is a complete schematic diagram of the present invention incorporated in the elevator channel of an automatic pilot system; and Figure 2 is another embodiment of the invention.

Turning now to Figure 1 of the drawing, the elevator circuit of an automatic pilot system for an aircraft having an elevator surface and trim tab surface may be generally similar to that described in copending application Serial No. 795,065, filed December 31, 1947, by P.

A. Noxon and assigned to the assignee of the present invention. The circuit is comprised generally of a take-off 11 on a vertical gyro 13 for developing a pitch attitude signal, an amplifier 14 for amplifying and detecting the phase of the signal, and a pair of servomotors 15 and 21 connected in parallel with the amplifier output. Servomotor 15 moves the elevator surface 22, and servomotor 21 moves the trim tab surface 23.

A change in the attitude of the aircraft from normal level flight, such as that caused by shifts in the center of gravity due to the movements of passengers or to the consumption of engine fuel, will cause the craft to assume a climb or dive attitude. Displacement of the craft in pitch displaces the rotor winding 25 of inductive device 11 relative to its stator winding 27, inducing a signal voltage in the stator winding. This voltage is applied to the servoamplifier 14 where it is amplified and its phase is detected. This amplifier is comprised generally of a preamplifier 29, a discriminator 31, and a magnetic amplifier 33.

Preamplifier 29 may be a conventional triode vacuum tube. The signal voltage is applied to the grid 37 of preamplifier 29, and the amplified signal voltage from plate 39 is applied as an undulating direct current by way of a lead 40 to phase discriminator 31.

Discriminator 31 is comprised of two conventional triode tubes 41 and 42. Plates 44 and 46 of these tubes are connected for excitation to the opposite ends of the center tapped secondary winding 48 of a power transformer 50; grids 53 and 59 are biased to cut-off and are connected to the plate circuit lead 49 of preamplifier 29; and cathodes 56 and 57 are grounded.

In the operation of discriminator 31, the same alternating current signal voltage is applied to grids 53 and 59. The alternating current voltages which are applied to the plates 44 and 46, however, are 180 degrees out of phase. Therefore, the phase of the signal voltage from preamplifier 29 determines which tube will conduct. Thus, it may be assumed that in the case of a change in aircraft attitude in which the craft noses downwardly, tube 41 will be operated, and in the case in which the craft noses upwardly, tube 42 will be operated.

Magnetic amplifier 33 comprised of a pair of saturable transformers 60 and 61 receives the output of discriminator 31 and develops an output for servomotors 15 and 21. Each saturable transformer has three windings on a soft iron core. Primary windings 62 and 63 are connected in series aiding across a suitable voltage source and constitute the energy input; secondary windings 67 and 68 are connected in series opposition and their leads 70 and 71 constitute the output leads; and control windings 72 and 73 are connected into the plate circuit leads 51 and 52 and constitute the control elements.

With the aircraft at a normal pitch attitude, a null or no signal condition will exist at winding 27 of the take-off device 11. No signal voltage will appear at grids 53 and 59 of discriminator 31 and no currents will flow from plates 44 and 46. Saturable transformers 60 and 61 will be balanced at this time since the voltage induced in the one secondary winding 67 will be equal in amplitude and opposite in phase to the voltage induced in the other secondary winding 68. Thus, no current will flow in output leads 70 and 71.

When a change in aircraft attitude occurs, the pitch displacement signal voltage induced in winding 27 of take-off device 11 is amplified by preamplifier 29 and impressed on grids 53 and 54 of discriminator 31. Depending upon the phase of the displacement signal, tube 41 or 42 will conduct. According to the assumption made above, a nose-heavy condition of the aircraft will cause tube 41 to conduct and a tail-heavy condition will cause tube 42 to conduct. The operation of tube 41 will provide an undulating direct current through the control winding 72 of saturable transformer 60, tending to saturate the core of the transformer and reduce the alternating current induced in the secondary winding 67. This destroys the balanced condition of saturable transformers 60 and 61 and a current flows in the output leads 70 and 71. In a similar manner, the operation of tube 42 will provide a current in control winding 73 which will tend to saturate the core of saturable transformer 61. The current which flows in output leads 70, 71 at this time, however, will be opposite in phase to that which flows during the nose-heavy attitude of the aircraft.

Shaft 75 of motor 15 is coupled in a suitable manner to the elevator surface 22 and shaft 76 of motor 21 is coupled through a suitable high gear ratio mechanical connection to trim tab surface 23. These motors may be two phase induction motors. The variable phase windings 77 and 79 of motors 15 and 21 are connected to the output leads 70, 71 of magnetic amplifier 33 while their fixed phase windings 80 and 81 are continuously energized by a source of alternating current. Thus, the current from the output leads 70, 71 of the magnetic amplifier will cause both servomotors 15 and 21 simultaneously to move their respective flight surfaces. However, the variable phase winding 79 of trim tab servomotor 21 is connected with respect to the connection of the variable phase winding 77 of the elevator servomotor 15 so as to cause the trim tab to be moved in a clockwise direction as the elevator surface 22 is moved in a counterclockwise direction, and vice versa. A nose-heavy attitude of the aircraft will operate servomotor 15 in one direction to deflect the elevator surface 22 to lift the nose of the aircraft, and a tail-heavy attitude will operate the servomotor in an opposite direction to deflect the elevator to lower the nose of the aircraft to return the craft to the original flight attitude. A follow-up signal from an inductive device 85 provides for a dead-beat operation of servomotor 15 by the attitude displacement signal.

Rotor winding 86 of follow-up device 85 is suitably coupled to shaft 75 of servomotor 15, and stator winding 87 is connected in series with the stator winding 27 of pitch take-off 11 to the input circuit of the amplifier 14. The operation of servomotor 15 in response to a displacement signal rotates rotor winding 86 to develop in stator winding 87 a follow-up signal which is in phase opposition to the displacement signal that caused the motor operation. This signal tends to reduce the displacement signal. The displaced elevator surface also tends to correct the attitude of the aircraft and further reduce the displacement signal. The follow-back signal, then becoming the stronger of the two, will reverse the operation of the servomotor 15 to return the elevator to a position in which level flight will be maintained.

The displacement signal, initiating the operation of the elevator servomotor 15, was brought about by the change in the center of gravity of the aircraft caused by a shift in the loading of the craft. The operation of the servomotor in response to this signal changes the angle of attack of the elevator surface to offset the change in flight attitude. Because of the lag in the response of the craft to the deflection of the elevator, servomotor 15 overruns the proper deflection angle slightly, although the follow-up signal tends to wipe out the displacement signal impressed on the input to amplifier 14.

A change in aircraft loading has occurred so that the elevator surface must be maintained in a position other than the initial position of the elevator in order to maintain a level flight attitude. This new position alters the loading on the surface due to the change in the angle of attack of the elevator and requires a torque in order to maintain the surface in its new position. The torque required of servomotor 15 is supplied by the power leads 70, 71 and is due to a residual signal remaining in the system from amplifier 14. This signal is insufficient to operate motor 15 in the usual sense, the motor being stalled under the load. Nevertheless, it is sufficient to supply the required torque to maintain the elevator surface in its new position.

Trim tab servomotor 21 is not provided with a follow-up signal generator as in the case of the servomotor 15. Therefore, the operation of the trim tab servomotor is determined by the power supplied by the leads 70, 71. Servomotor 21 will continue to rotate and move trim tab surface 23 as long as power is being supplied to the elevator servomotor. Thus, the tab surface 23 will continue to be deflected to reduce the loading of the elevator surface until the residual signal in the system is wiped out, and the elevator surface will be continuously repositioned by servomotor 15. When this occurs, the trim tab then will be in a position to react continuously on the elevator and thus replace the force originally exerted by the elevator servomotor for maintaining the craft in a properly trimmed condition in level flight.

From the foregoing description of a known automatic pilot system, it is evident that the position of the trim tab surface is a function of the position of the center of gravity. With the craft in level flight and its center of gravity at normal position, the elevator surface and trim tab surface will be in a normal streamlined position. Should the center of gravity move forward, the craft will tend to dive. The operation of the automatic control system will deflect the elevator surface upwardly to raise the nose of the craft and, since the trim surface is operated in an inverse fashion, will deflect the trim tab surface downwardly. Conversely, should the center of gravity move aft, the craft will tend to climb. The elevator surface, therefore, will be deflected downwardly to lower the nose of the craft and the trim tab surface will be deflected upwardly.

In accordance with the present invention, an interconnection is provided between the trim tab mechanism and the servomotor for the main control surface whereby the torque of the servomotor is varied as a function of the trim tab position. The torque of the elevator servomotor, accordingly, is regulated as a function of the center of gravity.

In Figure 1 of the drawing, the excitation for the fixed phase winding 80 of servomotor 15 is applied through a potentiometer 100 whose wiper 102 is positioned by the mechanical linkage from trim tab servomotor 21 to trim tab 23. Thus, the trim tab servomotor positions the wiper 102 to control the excitation to the fixed phase winding 80 of elevator motor 15. In an induction motor, the maximum torque developed by the motor in response to excitation of the variable phase winding, as by an output from servo-amplifier 14, varies directly as the excitation applied to the fixed phase winding. Accordingly, with the present invention, the torque developed by the elevator servomotor 15 is regulated as a function of the center of gravity as indicated by the trim condition of the craft.

In Figure 2 of the drawing, an embodiment of the present invention is shown wherein parts shown in detail in Figure 1 are shown as block and given prime numbers. In Figure 2, the excitation to the fixed phase winding of the servomotor 15' is regulated by a differential transformer 20⁰ having a secondary winding 20¹ connected to the fixed phase winding of the servomotor and a movable primary winding 20² actuated by the trim tab servomotor 21'.

The foregoing has presented a novel apparatus for controlling the actuation of an aircraft control surface by a control system in response to a change in trim condition. The action of the control system on a control surface can be adjusted so that for a given displacement of the craft from reference the craft is speedily returned to reference, and this adjustment will thereafter be automatically varied as the center of gravity of the craft is shifted.

Although only one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. A control system for a craft having a control surface provided with a trim tab, comprising control surface power means, trim tab power means, control means for both said power means, craft attitude responsive means for operating said control means, and means operated by said trim tab power means for limiting maximum power of said control surface power means in response to said control means.

2. A steering system for a craft having a control surface provided with a trim tab surface, comprising control surface power means, trim tab power means, control means for said power means, craft attitude responsive means for actuating said control means in response to transient and sustained departures of said craft from a predetermined attitude whereby said control surface power means operates in response to transient and sustained departures to exert a force to move said control surface, and said trim tab power means operates in response to sustained departures of said craft to move said trim tab to relieve the force exerted by said control power means on said control surface, and means actuable by the trim tab power means for limiting maximum power of said control surface power means.

3. In a control system for an aircraft having a main control surface and a trim tab surface, reference means responsive to a change in craft attitude from a predetermined attitude for developing a corresponding signal, first means operatively connected to the main control surface for operating the main control surface in response to the signal, second means operatively connected to the trim tab surface for operating the trim tab surface in response to the signal, and means operable by the second means for limiting maximum power of the first means.

4. In a control system for an aircraft having a main control surface and a trim tab surface, a two-phase servomotor operatively connected to the main control surface and having one phase energized in response to signals corresponding to changes in conditions and the other phase energized by an excitation source, power means operatively connected to the trim tab for operating the trim tab, and means operated by the power means for changing excitation of said other phase of the servomotor to limit maximum power of the servomotor.

5. In a control system for an aircraft having a main control surface and an auxiliary surface, a two-phase servomotor operatively connected to the main control surface and having one phase energized in response to signals corresponding to changes in a condition and the other phase energized in accordance with the position of the auxiliary control surface.

6. In a control system for an aircraft having a main control surface and an auxiliary surface, a servomotor operatively connected to the main control surface, means responsive to a condition for controlling operation of said servomotor, and means operatively connected to the auxiliary control surface for varying maximum torque exerted by the servomotor on the main control surface in accordance with the position of the auxiliary control surface.

References Cited in the file of this patent

UNITED STATES PATENTS

| | | |
|---|---|---|
| 2,626,114 | Alderson | Jan. 20, 1953 |
| 2,673,314 | MacCallum | Mar. 23, 1954 |
| 2,733,879 | Noxon | Feb. 7, 1956 |